W. LOUDEN.
STRUCTURAL COUPLING FOR PIPES, SHAFTS, AND THE LIKE.
APPLICATION FILED NOV. 18, 1910.
1,092,655.  Patented Apr. 7, 1914.
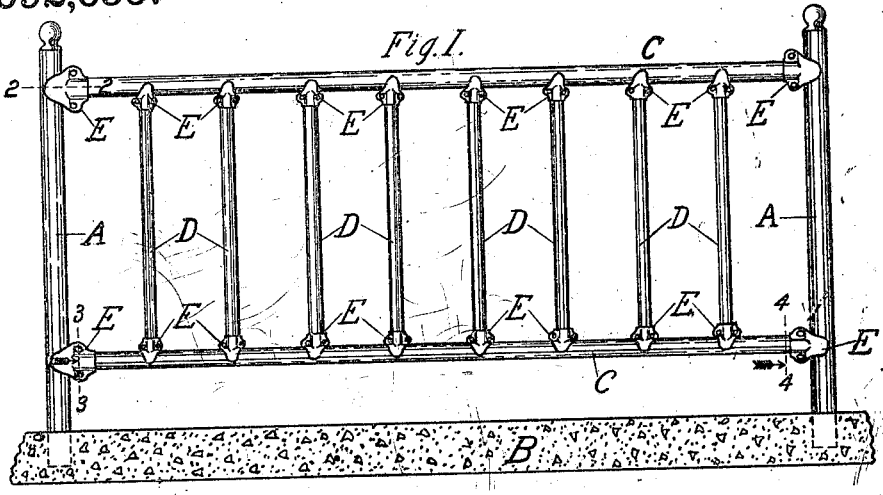
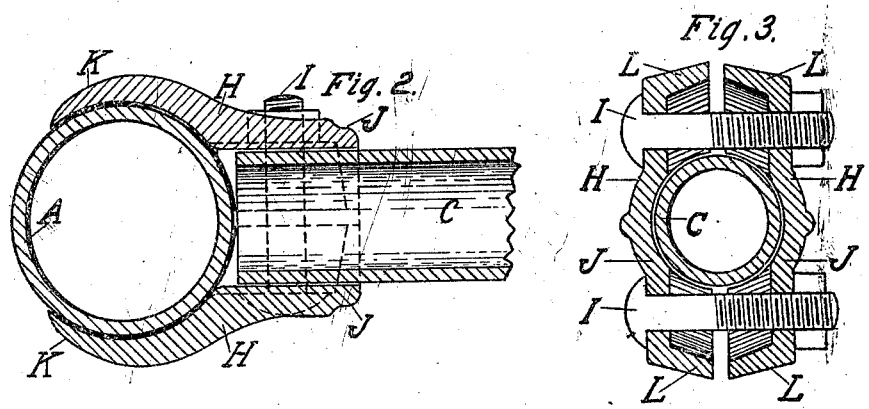
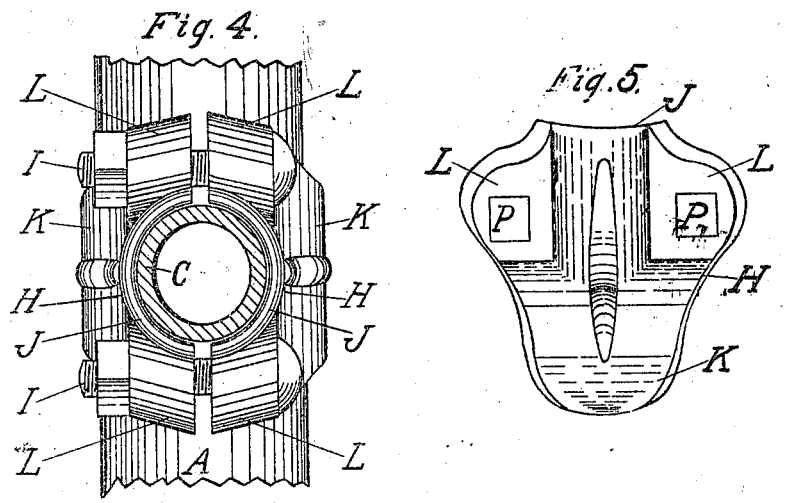
WITNESSES
H. R. Sheridan.
Edw. C. Peterke.
INVENTOR.
William Louden.

UNITED STATES PATENT OFFICE.

WILLIAM LOUDEN, OF FAIRFIELD, IOWA.

STRUCTURAL COUPLING FOR PIPES, SHAFTS, AND THE LIKE.

1,092,655.

Specification of Letters Patent.

Patented Apr. 7, 1914.

Application filed November 18, 1910. Serial No. 593,040.

*To all whom it may concern:*

Be it known that I, WILLIAM LOUDEN, residing at Fairfield, in the county of Jefferson and State of Iowa, have invented a new and useful Improvement in Structural Couplings for Pipes, Shafts, and the like, of which the following is a specification.

My invention relates to couplings designed to join the end of one pipe or shaft to the body of a second pipe or shaft disposed at an angle thereto; and it consists of two clamping members each made concave longitudinally at one end to fit the end section, and at the opposite end provided with a wing curved to fit and embrace the body of the second pipe, and means to draw and hold the two members together to exert an equal clamping pressure on each pipe or shaft and hold the two secured one to the other. Also of other features set forth in this specification and more definitely pointed out in the claims.

In the accompanying drawings forming a part of this specification, Figure 1 is a side view of a section of railing for an inclosure, embodying in its construction the features of my invention. Fig. 2 is an enlarged transverse section on line 2—2 of Fig. 1. Figs. 3 and 4 are the same on lines 3—3 and 4—4 of Fig. 1, looking in the direction of the arrows. Fig. 5 is an enlarged detail view.

Referring to the drawings, A represents tubular posts or columns supported by a suitable foundation B.

C represents upper and lower horizontally disposed tubular rails having their ends connected to the bodies of said posts between their ends.

D represents a series of uprights having their upper and lower ends connected to the bodies of the upper and lower rails C between the posts A.

It is preferable, as shown in the drawings, to have the posts A a little larger than the rails C, and the rails C a little larger than the uprights D. The connections of all the parts are made by means of couplings E, comprising two mating members H, and bolts I to draw and hold the members together.

It will be seen by Figs. 2, 3, 4 and 5 of the drawings, that the members H have the inner faces of their ends J longitudinally concaved to fit the ends of the rails C, while their ends K are curved to fit the body of the posts A. The ends J are also fitted with laterally extended lugs L having perforations P to receive the bolts I, said lugs being widened out beyond and merged into the curved ends and the perforations being so placed that the bolts will be in close proximity to the adjacent sides of the posts A and rails C.

As shown by Fig. 2, the curved ends K extend only a little over half of the way around the posts A, thus leaving their outer sides smooth and not liable to catch on anything passing in contact around the posts. All that is necessary is for the curved ends K to pass far enough around to prevent them from slipping on the post, and to prevent the ends of the rails from getting disconnected from the posts.

The members H being constructed so their bearings will be approximately equal on the ends and bodies of the parts they are connecting, and the bolts I being placed approximately adjoining the sides thereof, said parts will be securely held together without drilling any holes therein, or having clamping means on the outer sides of the bodies of the rails.

The couplings which connect the ends of the uprights D to the bodies of the upper and lower rails C are constructed in the same way as those which connect the ends of the rails C to the bodies of the posts A, only being made of the proper size to suit the size of the parts which they connect. In this case the ends J are placed on the uprights D and the wings K catch over the bodies of the rails C.

The invention is extremely simple and inexpensive, and is readily adjusted as required. All that is necessary is to loosen the bolts I and slip the parts along to the desired place and then tighten the bolts. Being of the proper lengths there is no drilling of holes or any machine work needed on any of the parts. It is preferable that the concaves in the ends J be disposed at substantially right angles to the curve in the wings K, as shown in the drawings, but the angle may be varied to suit requirements.

What I claim is:

1. A structural coupling for pipes, shafts and the like, which members are adapted to be set at an angle to each other and in substantially the same plane whereby the end of one member will abut the side of the other, comprising two clamping members each made concave longitudinally at its one end to fit the end of the member to be coupled, and at the opposite end provided with a wing curved to fit and embrace the body of the second member to be coupled, lugs formed on each side of the concave portion, and fastening means received through said lugs closely adjacent the second member to cause the coupling members to exert an equal clamping pressure on each of the members to be coupled.

2. A structural coupling for pipes, shafts and the like, which members are adapted to be set at an angle to each other, and in substantially the same plane, whereby the end of one member will abut the side of the other, comprising two clamping members, each made concave longitudinally at its one end to fit the end of the member to be coupled, and at the opposite end provided with a wing curved to fit and embrace the body of the second member to be coupled, lugs formed on each side of the concave portion, said lugs having openings therethrough disposed in the angle approximately equidistant between the members to be coupled, and means received through said openings to clamp the two coupling members together, and to exert an equal pressure on each of the members to be coupled.

WILLIAM LOUDEN.

Witnesses:
CARRIE L. BEEDLE,
JOE E. ROBERTSON.